US008881993B2

(12) United States Patent
Lev

(10) Patent No.: US 8,881,993 B2
(45) Date of Patent: *Nov. 11, 2014

(54) SHOWERHEAD WITH MULTIMODAL OPERATION

(76) Inventor: Mordechai Lev, West Bloomfield, MI (US)

( * ) Notice: Subject to any disclaimer, the term of this patent is extended or adjusted under 35 U.S.C. 154(b) by 112 days.

This patent is subject to a terminal disclaimer.

(21) Appl. No.: 13/219,965

(22) Filed: Aug. 29, 2011

(65) Prior Publication Data

US 2011/0309165 A1 Dec. 22, 2011

Related U.S. Application Data

(63) Continuation of application No. 12/424,231, filed on Apr. 15, 2009, now Pat. No. 8,061,631.

(60) Provisional application No. 61/045,040, filed on Apr. 15, 2008.

(51) Int. Cl.
*A01G 27/00* (2006.01)
*B05B 1/16* (2006.01)
*B05B 1/18* (2006.01)

(52) U.S. Cl.
CPC *B05B 1/1636* (2013.01); *B05B 1/18* (2013.01)
USPC ............................................ 239/69; 239/394

(58) Field of Classification Search
CPC ............................. A01G 25/16; A01G 25/165
USPC ................. 239/394, 391, 390, 392, 393, 395, 239/67–70, DIG. 15
See application file for complete search history.

(56) References Cited

U.S. PATENT DOCUMENTS

| | | | | |
|---|---|---|---|---|
| 5,199,639 | A | 4/1993 | Kobayashi et al. | |
| 5,853,130 | A | 12/1998 | Ellsworth | |
| 6,412,711 | B1 * | 7/2002 | Fan | 239/446 |
| 8,061,631 | B2 | 11/2011 | Lev | |
| 2006/0255176 | A1 | 11/2006 | Yeiser | |

FOREIGN PATENT DOCUMENTS

| | | | |
|---|---|---|---|
| JP | 404219157 | A * | 8/1992 |

* cited by examiner

*Primary Examiner* — Davis Hwu

(74) *Attorney, Agent, or Firm* — Blue Filament Law PLLC; Avery N. Goldstein

(57) ABSTRACT

A showerhead for personal hygiene is provided that includes a spray face in fluid communication with a cavity by way of a plurality of nozzle apertures. The cavity receives water from a water supply. A spray selector controls fluid flow between the cavity and the nozzle apertures. A battery-electric motor or a kinetic energy storing spring is provided as a power supply for an actuator that provides mechanical communication between the power supply and the selector to move the selector and thereby alter the fluid spray pattern from the spray face. A user interface provides a user with selective control over movement of the actuator and the movement of the selector to sequentially provide multiple spray patterns from the spray face without intermediate manual intervention between the multiple spray patterns emitted from the spray face.

9 Claims, 4 Drawing Sheets

SHOWERHEAD WITH MULTIMODAL OPERATION

CROSS-REFERENCE TO RELATED APPLICATIONS

This application is a continuation of U.S. patent application Ser. No. 12/424,231 filed Apr. 15, 2009 which in turn claims priority of U.S. Provisional Patent Application Ser. No. 61/045,040 filed Apr. 15, 2008, these applications are incorporated herein by reference.

FIELD OF THE INVENTION

The present invention in general relates to a personal hygiene showerhead, and in particular to a showerhead offering multiple modes of operation with a controller having a mechanical or electrical power source to control effluent properties within a mode of operation.

BACKGROUND OF THE INVENTION

Conventional showerheads are characterized by a valve controlling water flow to the showerhead and often a mode selector that allows a user to adjust the effluent spray pattern from the showerhead. While numerous structures have been developed to vary the showerhead aperture dimensions and/or number to modify the spray pattern, these showerheads have in common the requirement of manual actuation of a valve or apertured disc to modify showerhead effluent spray pattern. As a result, only a single spray pattern is experienced before a manual adjustment is required to sample another spray pattern. The requirement of user intervention to modify the spray pattern practically results in a less beneficial therapeutic bather experience, as well as excessive water usage through a water massage spray sequence not being followed with adequate temporal control.

While regulations exist as to maximal personal hygiene showerhead flow rates, the limitation of showerhead flow rate has no impact on the duration of shower usage. While timed showerhead flow valves are in widespread use in the institutional setting, such timed showerheads likewise fail to afford more than a binary action (off-on) between manual manipulations.

Thus, there exists a need for a showerhead providing multiple spray patterns without resort to a manual manipulation between each spray pattern. There also exists a need for a showerhead providing variation in flow rate without manual manipulation between the flow rates.

SUMMARY OF THE INVENTION

A showerhead for personal hygiene is provided that includes a spray face in fluid communication with a cavity by way of a plurality of nozzle apertures. The cavity receiving water from a water supply. A spray selector controls fluid flow between the cavity and the nozzle apertures. A battery-electric motor or a kinetic energy storing spring is provided as a power supply for an actuator that provides mechanical communication between the power supply and the selector to move the selector and thereby alter the fluid spray pattern from the spray face. A user interface provides a user with selective control over movement of the actuator and the movement of the selector to sequentially provide multiple spray patterns from the spray face without intermediate manual intervention of the spray face between the multiple spray patterns emitted from the spray face.

DETAILED DESCRIPTION OF THE PREFERRED EMBODIMENTS

The present invention has utility as a showerhead for personal hygiene. An inventive showerhead has a valve actuator that is powered mechanically or electrically to provide variation in spray pattern, variation in water flow, or a combination thereof upon a user initiating valve actuator operation. A user interface includes one or more user interface buttons each corresponding to a different multimodal operational program for the showerhead. A user programmable keypad allowing a user to select between different spray modes, flow rates and a combination thereof is also provided within an integral showerhead housing or a remote control. A user is able to change modes without intervening manual manipulation between modes; as a result an enhanced massage experience is provided. A timed shower period, reduced water flow patterns, or a combination thereof is also provided to save water.

Figure 1:
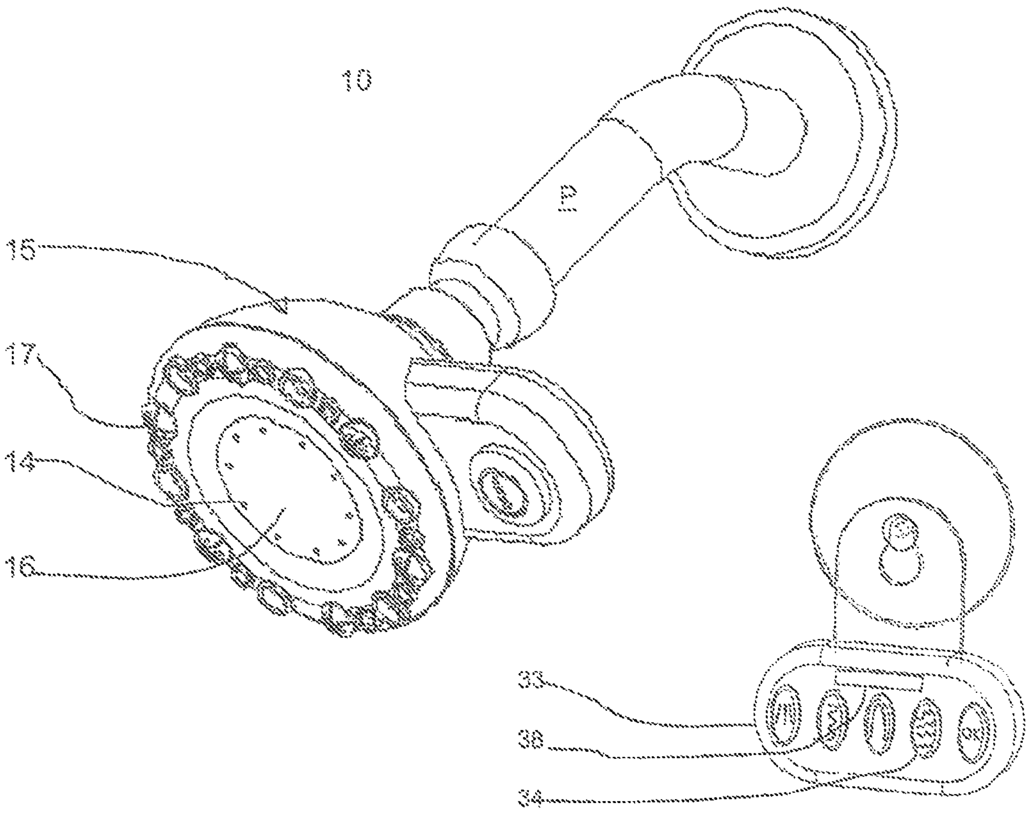
FIG. 1 is a perspective view of an inventive showerhead with an inset depicting a remote control therefor that communicates user interface commands to the showerhead proper.
Figure 2:
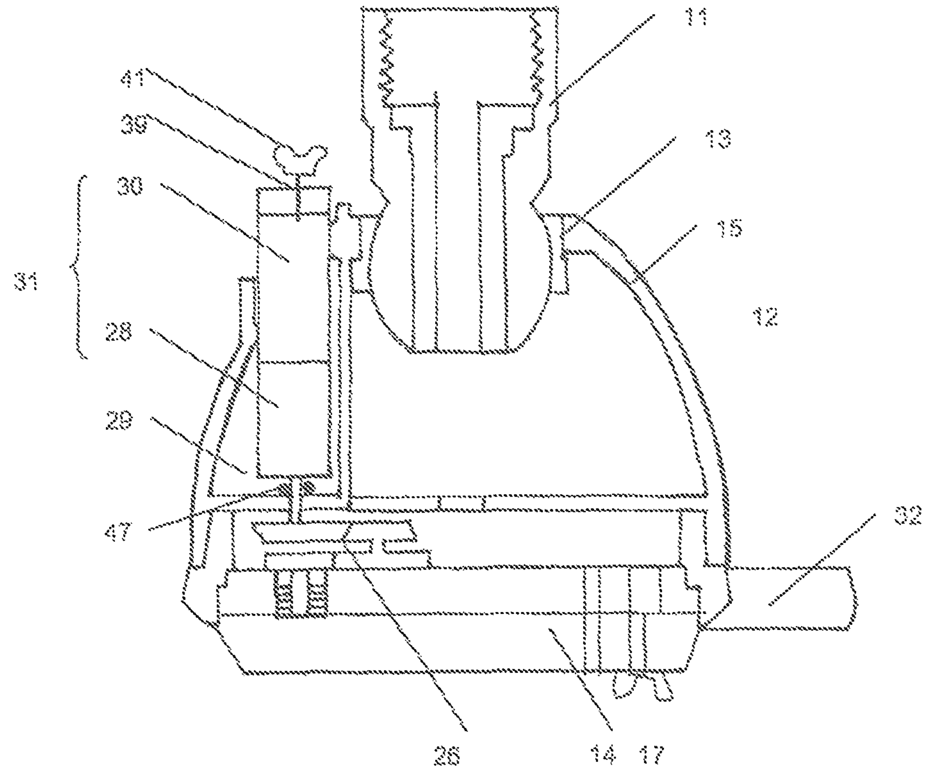
FIG. 2 is a transverse cross-sectional view of the showerhead of FIG. 1.

Referring now to FIGS. 1 and 2, an inventive showerhead is shown generally at 10. The showerhead 10 is coupled to a pressurized water supply pipe P. The showerhead 10 has a ball joint 11 extending to a mixing cavity 12 in fluid communication with nozzle apertures 14. A seal 13 contains water with the cavity 12 defined by the housing 15. The nozzle apertures 14 terminate in a spray face 16. The spray face 16 is appreciated to be a wall mounted spray head or extend by way of a flexible tube water supply pipe P to a handheld spray head. A valve actuator 18 is mechanically coupled to a conventional rotary spray pattern selector 20. A spray pattern selector 20 rotates to provide selective fluid communication between water within the pipe P and a given nozzle aperture 17. It is appreciated that the spray face 16 can be planar, convex or concave and need not be displaced in height relative to apertures 17. With a large number of aperture nozzles 17 being in fluid communication a wide, low pressure spray pattern is provided relative to when a smaller number of like sized nozzle apertures are in fluid communication with the water supply. It is appreciated that a selector 20 also varies the shape of as well as the overall nozzle area. A large nozzle area is associated with a low pressure flow while a smaller nozzle area corresponds to a comparatively higher pressure flow pattern. A spray face 16 and a selector 20 are readily formed of materials conventional to the art illustratively including thermoplastics, thermoset resins and non-corroding metals such as brass alloys, aluminum and stainless steel.

An inventive valve actuator 18 has a coupling to mechanically engage the rotary selector 20. The gear train 26 is coupled to a motor 28 that when energized displaces the gear train 26 and in turn moves the selector 20 so as to modify flow pattern and/or flow rate from the showerhead 10. The motor 28 is located within motor cavity 29 of the housing 15. The motor 28 is energized by a battery 30 collectively forming a power supply 31. An alternative power supply 31 is either a battery or a spring storing kinetic energy and includes a manual crankshaft 39 with a manually turnable wing nut 44 to facilitate cranking. The power supply cavity 29 is sealed with a door 37. An O-ring 47 prevents water entry into the motor compartment 29.

Figure 3A:
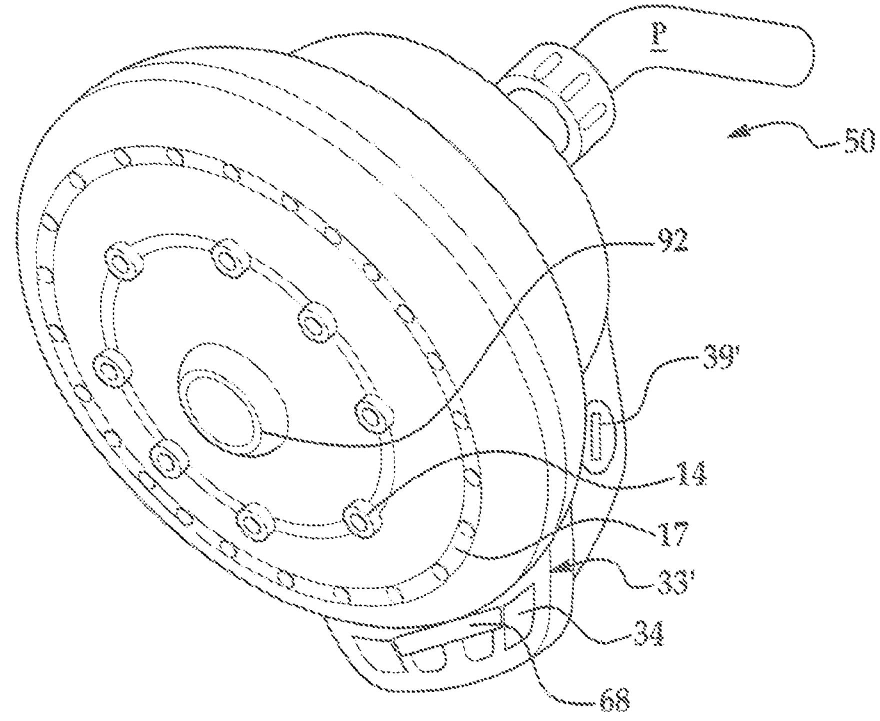
FIG. 3A is a perspective front view of an inventive showerhead with an integrated user interface.
Figure 3B:
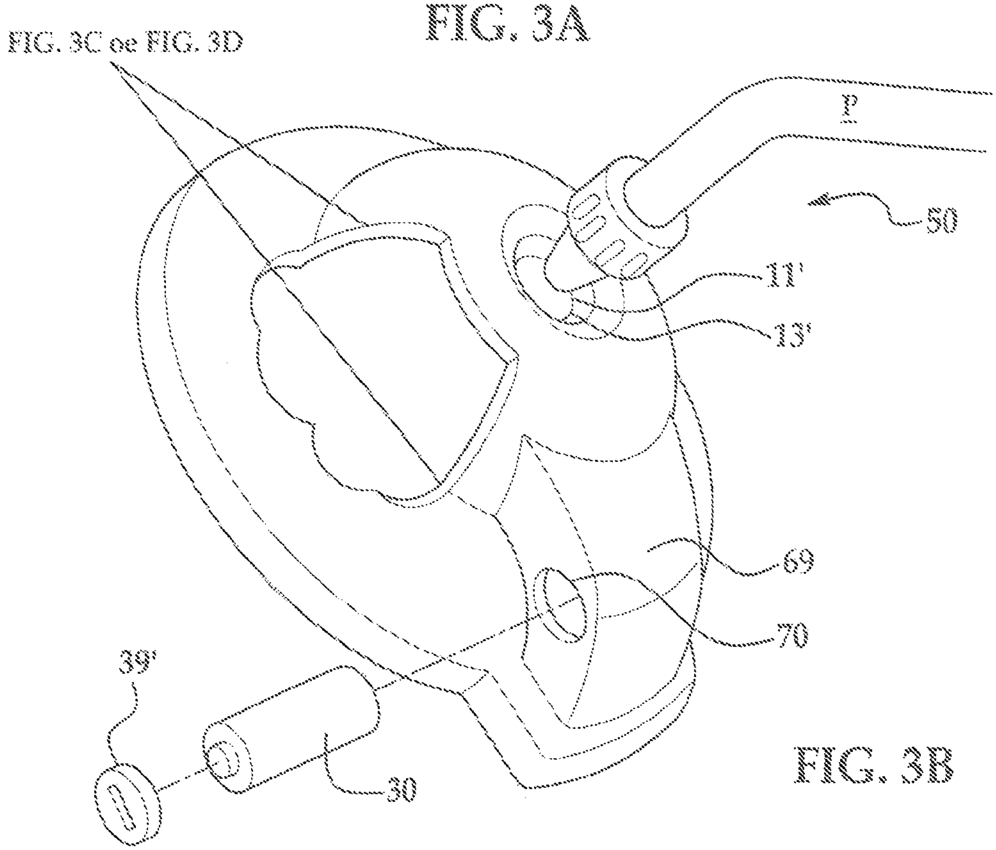
FIG. 3B is a partial cutaway exploded rear perspective view of the showerhead of FIG. 3A with an expanded view, partial cutaway of an inset provided in alternate embodiments in FIGS. 3C and 3D.
Figure 3C:
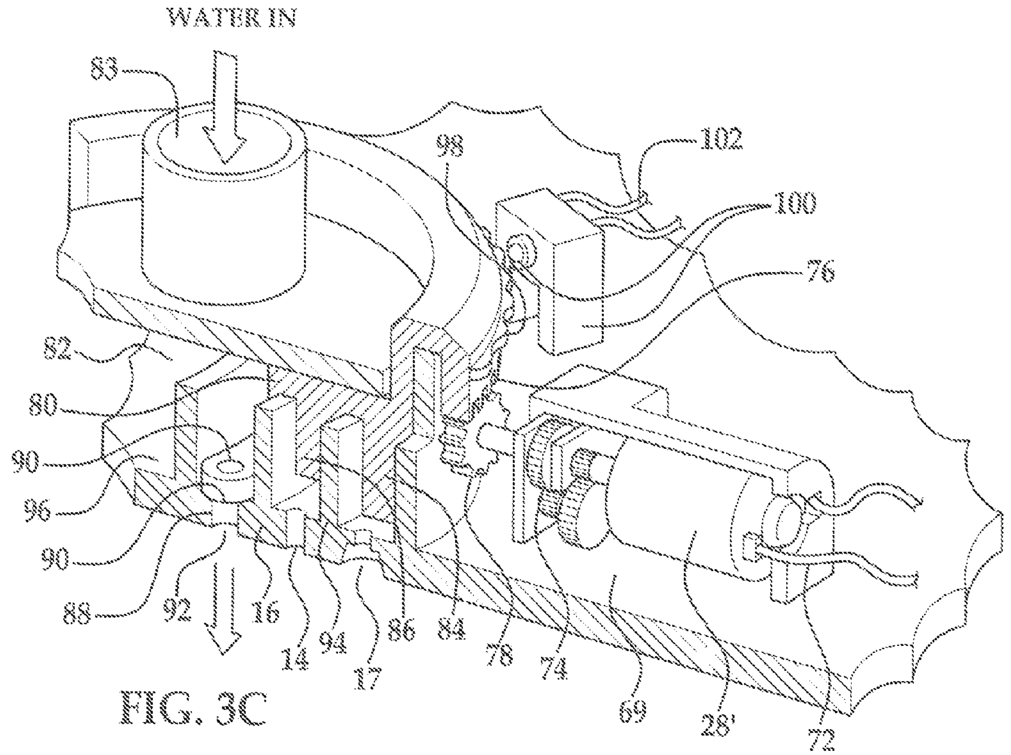
FIG. 3C is a partial cutaway view of an inventive showerhead mechanism operating with a cam system for mode control.
Figure 3D:
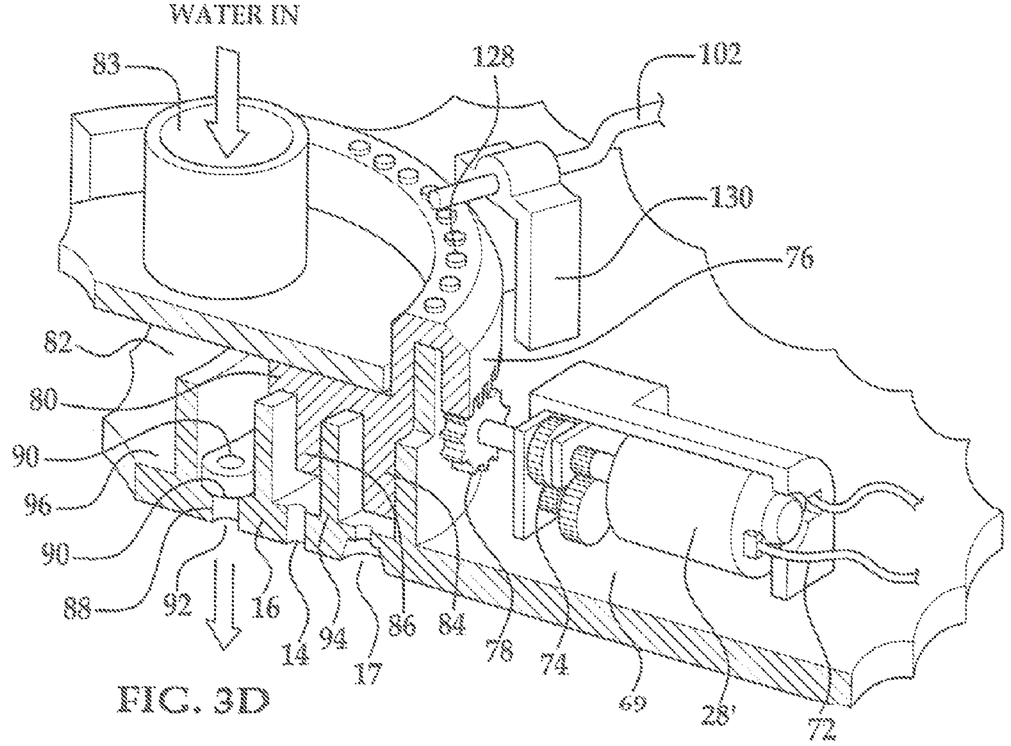
FIG. 3D is a partial cutaway view of an inventive showerhead mechanism operating with a magnet system for mode control.

The power supply 31 provides rotary movement of the selector 20 through intermittent movement, a cam system or a magnetic system, the latter depicted in greater detail in FIGS. 3C and 3D, respectively.

The battery 30 is either a disposable button type, alkaline battery, or a rechargeable battery. An ultra capacitor is contemplated as an alternative to a rechargeable battery. A battery charger accessory is contemplated to charge a second battery for exchange while a first battery is depleted of electrical charge through use in an inventive showerhead 10 or 50. In instances when the battery 30 lacks a charge sufficient to operate the selector 20, or a spring power supply 31 is unwound, an inventive showerhead operates as a conventional showerhead.

In instances when the battery 30 is present as a power source, an inventive showerhead 10 optionally also includes a printed circuit board 32 capable of storing multiple mode spray pattern and/or flow rate programs for the operation of the showerhead. A user interface 33 includes one or more buttons 34 to access pre-programmed modes and optionally a display 38 to allow a user to program a custom multimode operational program for the While the interface 33 is depicted as a remote control communicative to the board 32 by way of infrared or radio frequency communication, it is appreciated that an interface 33 is readily formed with an insulated electrical wire extending between the board 32 and the interface 33 and communicating user mode preferences.

A selector 20 changes the mode of water flow delivery from an inventive showerhead. By way of example, a pre-programmed relaxation program provides a sixty second soft spray followed by thirty second high pressure flow, followed by sixty seconds of soft aeration spray. It is appreciated that the duration and order of these modes are readily changed. A pre-programmed energizing program may alternate full spray mode with massage function modes. It is appreciated that a mode also is optionally provided that delivers water at a reduced rate of less than 2.5 gallons per minute. The pre-programmed set of modes includes an optional pause mode to not only save water, but afford a user an opportunity to apply cleanser. At the end of the program, the shower flow either remains in constant spray mode or shuts off water flow from the spray head.

Referring now to FIGS. 3A-3D, an inventive showerhead is shown generally at 50. The showerhead 50 has a ball joint 11' extending to a cavity 52 in fluid communication with nozzle apertures 54. A seal 13' contains water within the cavity 52 defined by the housing 55. The nozzle apertures 54 terminate in a spray face 56. The ball joint 11' is joined to water supply pipe P or to a flexible tube water supply pipe P to form a handheld spray head. Housing 55 includes a motor compartment 69 which forms a watertight space upon a door 39' engaging an aperture 70 therein. The aperture 70 is sized to receive a battery 30.

The showerhead 50 has a user interface 63 that includes one or more buttons 64 and optionally a display 68 to allow a user to program a custom multimodal operational program or select from a number of preselected programs available with the inventive showerhead 50. By way of example, one button corresponds to the pre-programmed relaxation program while another for example corresponds to the pre-programmed energizing program detailed above. The display 68 can be by way of example a liquid crystal display, the display 68 deriving power from the battery 30. The circuitry (not shown) is provided intermediate and in electrical communication between the battery 30 and display 68 and preferably also intermediate between the battery 30 and an electric motor 28'.

FIG. 3C represents an expanded partial cutaway of the working components found within the housing 55. For visual clarity, a motorized shower mechanism provided in FIG. 3C depicts a single cam track and a single microswitch. A motor 28 is connected to wires 72 that extend to electrical circuitry (not shown). The circuitry provides electrical input modification to changes in voltage being provided to the motor 28' and includes control functions to translate user activation of a button 34 into an operational program. In the event that a display 68 is present, memory is provided that selectively displays appropriate icons and characters therein. Optionally, the electric circuitry includes read-write memory to accept user input programming. The electric motor is contained within watertight motor compartment 69 and is enmeshed with a gear train 74. The gear train 74 transmits rotational energy from the motor 28' to a selector 20 having a gear rack 76 also enmeshed with the gear train 74 by way of a drive gear 78. As the gear rack 75 rotates the mechanical power input from the motor 28' via the gear train 74 and gear 78, the selector 20 has aperture restricting structure 80 extending into a mixing cavity receiving water via aperture 83. The aperture restricting structure 80 optionally includes multiple teeth 84 and 86 concentrically displaced to overlap occasionally nozzle apertures 14 and 17, respectively. As shown in FIG. 3C, a third tooth 88 is shown having a hole 90 therethrough that changes the flow pattern through a central nozzle aperture 92 in the spray face 16. Optionally, ribs 94 extend from the back surface 96 of spray face 16 and into the mixing cavity 82. The ribs 94 provide mechanical support for the aperture restricting structure 80.

A cam track 98 associated with the selector 20 provides a series of points that vary in radial diameter. While the portion of cam track 98 depicted in FIG. 3C shows a uniform sinusoidal undulation, it is appreciated that the variations along the cam track 98 can be discontinuous, such as forming a square wave, and need not be of uniform shape or dimension. Additionally, it is appreciated that several spaced cam tracks such as cam track 98 are provided around the diameter of the selector 20 with each track denoting a different program. A microswitch 100 upon detecting a given feature on cam track 98 sends a signal to the motor 28 that deactivates the motor thereby creating effluent from the spray face in a different spray mode. The signal from the microswitch 100 is communicated via electrically insulated wire 102 either directly to the motor 28' or through circuitry. As a result, a user depressing a button 34 on the control pad 33' can initiate a given program including at least two different spray output modes. In instances when there are multiple cam tracks around the periphery of the selector 20, preferably each such cam track has a devoted microswitch that is activated to control motor 28' when a button 34 on the control pad 33' is activated that corresponds to the given cam track.

Referring now to FIG. 3D, a motorized shower mechanism is provided based on a read switch and at least two magnets associated with the selector 20. With respect to FIG. 3D, where like numerals are used with respect to this mechanism, the meaning associated with the reference numeral is intended to be that associated with the reference numeral in the previously described figures. FIG. 3D is otherwise the same as FIG. 3C except the mechanical cam tracks of FIG. 3C (as shown in a single representative embodiment with respect to reference numeral 98) have been replaced with a radial grouping of magnets 128. While the radial group of magnets 128 depicted in FIG. 3D. A read switch 130 senses the position of magnet from within the radial group of magnets 128 and sends a signal to the motor 28', preferably by way of circuitry to modify the operation of motor 128 so as to modify motor operation to activate, deactivate, vary speed or a combination thereof so as to effectively change the shower mode through rotary change of the selector 20. The signal from the read switch 130 to the motor 28' is conveyed via wires 102.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A showerhead for personal hygiene comprising:

a spray face;

a cavity in fluid communication with a water supply and said spray face by way of a plurality of nozzle apertures, each having a first aperture area and at least one second aperture having a second area that is different than the first nozzle area;

a spray selector controlling fluid flow between said cavity and each of the plurality of nozzle apertures; a power supply of a battery-electric motor or a spring;

an actuator providing mechanical communication between said power supply and said selector to move said selector;

a set of pre-programmed program modes for sequentially operating a set of multiple spray patterns for varying durations and intensities during a program mode, said spray patterns are generated by the rotation of said spray selector relative to said spray face, and said spray selector varies the shape and an overall nozzle area of each of said plurality of nozzle apertures to modify flow pattern and flow rate from said showerhead;

a user interface for providing a user with selective movement of said selector to sequentially provide said set of multiple spray patterns from said spray face without intermediate manual intervention between the multiple spray patterns from said spray face; and wherein said user interface comprises buttons that initiate and select programs from among said set of pre-programmed program modes for sequentially operating the multiple spray patterns for varying durations and intensities during a program mode.

2. The showerhead of claim 1 further comprising circuitry programmable by the user to provide a plurality of spray patterns independent of intermediate manual manipulation of the shower face between each of said plurality of spray patterns.

3. The showerhead of claim 2 wherein said actuator is located within a waterproof compartment of a unified housing of the showerhead.

4. The showerhead of claim 1 further comprising a printed circuit board configured for storing multiple mode spray pattern and flow rate programs for the operation of said showerhead.

5. The showerhead of claim 1 further comprising a display; and wherein said buttons and said display allow a user to program said showerhead with a custom multimode operational program.

6. The showerhead of claim 4 wherein said user interface is a remote control communicative to said board by way of infrared or radio frequency communication.

7. The showerhead of claim 4 wherein said user interface is a remote control communicative to said board via an insulated electrical wire.

8. The showerhead of claim 1 wherein at the end of a selected program mode the shower flow either remains in constant spray mode or shuts off water flow from the spray head.

9. The showerhead of claim 1 wherein said program modes include a pause mode for water delivery.

* * * * *